(12) United States Patent
Wowczuk et al.

(10) Patent No.: US 12,454,002 B2
(45) Date of Patent: Oct. 28, 2025

(54) SYSTEMS AND METHODS FOR HYBRID SAND CASTING

(71) Applicant: Matthews International Corporation, Pittsburgh, PA (US)

(72) Inventors: Yurij F. Wowczuk, Pittsburgh, PA (US); Jake A. Vargo, Washington, PA (US); Bernard A. Kuhn, Jr., Baden, PA (US); Gregory Allen Geers, Pittsburgh, PA (US)

(73) Assignee: Matthews International Corporation, Pittsburgh, PA (US)

( * ) Notice: Subject to any disclaimer, the term of this patent is extended or adjusted under 35 U.S.C. 154(b) by 0 days.

(21) Appl. No.: 17/708,842

(22) Filed: Mar. 30, 2022

(65) Prior Publication Data

US 2022/0314307 A1    Oct. 6, 2022

Related U.S. Application Data

(60) Provisional application No. 63/168,105, filed on Mar. 30, 2021.

(51) Int. Cl.
| | |
|---|---|
| *B22C 9/10* | (2006.01) |
| *B22C 9/22* | (2006.01) |
| *B33Y 10/00* | (2015.01) |
| *B33Y 80/00* | (2015.01) |

(52) U.S. Cl.
CPC .......... *B22C 9/10* (2013.01); *B22C 9/22* (2013.01); *B33Y 10/00* (2014.12); *B33Y 80/00* (2014.12)

(58) Field of Classification Search
CPC ............ B22C 9/02; B22C 9/10; B22C 9/22
USPC .............................. 164/23, 27, 28, 137, 159
See application file for complete search history.

(56) References Cited

U.S. PATENT DOCUMENTS

| | | | |
|---|---|---|---|
| 4,691,754 A | 9/1987 | Trumbauer et al. | |
| 4,733,712 A | 3/1988 | Koppenhofer | |
| 6,446,697 B1 | 9/2002 | Shaikh et al. | |
| 6,568,455 B2 * | 5/2003 | Zieverink | A44C 27/00 700/118 |
| 2002/0138167 A1 | 9/2002 | Uchida et al. | |
| 2002/0157799 A1 | 10/2002 | Sachs et al. | |
| 2013/0221192 A1 | 8/2013 | Rocco et al. | |
| 2014/0150984 A1 | 6/2014 | Nishikawa et al. | |

(Continued)

OTHER PUBLICATIONS

Upadhyay et al. "3D Printing for Rapid Sand Casting—A Review" 2017, Journal of Manufacturing Processes 29:211-220 (Retrieved from internet on May 15, 2022) https://www.sciencedirect.com/science/article/abs/pii/S1526612517301810.

*Primary Examiner* — Kevin P Kerns
(74) *Attorney, Agent, or Firm* — DLA Piper LLP

(57) ABSTRACT

A hybrid method of casting a metal product is disclosed. The method includes obtaining a product design, creating a mold insert based on the product design, creating a mold base based on the product design, assembling the mold insert with the mold base to form an assembled mold, casting the metal product with the assembled mold, and post-processing the metal product. In some embodiments, creating a mold insert includes generating printing instructions for a mold insert based on the product design and printing a mold insert configured to mate with a product mold (for example, a mold produced by traditional sand molding processes) based on the printing instructions.

36 Claims, 13 Drawing Sheets

(56) References Cited

U.S. PATENT DOCUMENTS

2016/0175928 A1  6/2016  Roshan
2017/0021573 A1  1/2017  Yerazunis et al.
2021/0291259 A1  9/2021  Wowczuk et al.

* cited by examiner

The effects of uniform slicing. (a) Original model;
(b) uniformly sliced part; (c) adaptively sliced part

SYSTEMS AND METHODS FOR HYBRID SAND CASTING

CROSS-REFERENCE TO RELATED APPLICATIONS

The present application claims priority to and benefit of U.S. Provisional Application No. 63/168,105 filed Mar. 30, 2021, the disclosure of which is hereby incorporated by reference herein in its entirety.

TECHNICAL FIELD

The present disclosure relates generally to methods, systems, and apparatuses related to preparing sand molds for metal casting. More particularly, the present disclosure relates to hybrid techniques utilizing 3D printed sand molding and traditional sand molding to manufacture molds for metal products. The disclosed techniques may be applied to, for example, manufacture of memorial products with one or more personalized features.

BACKGROUND

Metal casting involves pouring liquid metal into a mold having an interior cavity shaped in the form of the desired product. The liquid metal is allowed to cool and solidify within the mold to produce a metal product corresponding to the shape of the interior cavity. For example, sand casting is a conventional molding process whereby foundry sand or other particulate material is tightly packed within a casting flask, that is, a metal or wooden box frame. The foundry sand or particulate material includes a binder and may be hardened (for example, by curing or baking) to form a solidified negative impression corresponding to the metal product. When liquid metal is poured into the mold, those negative impressions contribute to forming the one or more surfaces of the metal product and the metal product itself.

FIG. 1 depicts exemplary tooling for a conventional sand casting process. In a typical sand casting process, a solid replica of the metal product to be cast is fashioned from one or more materials such as aluminum or wood known as a 'pattern'. In some instances, the replica may be divided into two or more parts, for example, split along a parting line 103 into upper and lower halves. The patterns are placed within top and bottom halves of the flask, that is, the 'cope' 101 and 'drag' 102, respectively, and foundry sand is poured and tightly packed into the cope 101 and drag 102 over the pattern and hardened. Thereafter, the patterns are removed and the cope 101 and drag 102 are mated and locked together to form the mold cavity 104, that is, a negative impression of the metal product. According to FIG. 1, sprue pins (not shown) and the like may be used to form additional channels through the foundry sand in order to facilitate pouring and conveying of the liquid metal, and other structures include one or more of a pouring cup 110, runner 109, a riser 108, a gate 107, one or more vents 106, and the like. One or more cores 105 may also be placed within the mold cavity in order to form hollow features in the final metal product.

Creation of molds by sand casting is a labor-intensive and time-consuming manual process. Bronze metal casting manufacturers often create one-of-a-kind products, such as signs, memorials, plaques, and sculptures. As such, the molds are typically unique forms with personalized or customized features that are individually created for a specific casting. Such molds are generally only produced once and might never be used for another casting. Accordingly, the time and effort required to create the mold is a significant portion of the manufacturing costs associated with producing a bronze product.

Traditional sand casting processes also present various difficulties associated with intricate details and personalized or customized features including lettering. Flat faced polymer letters may be applied to a standard aluminum or wood pattern with glue but often result in polymer bubbles. Handset letters may also be placed and shrink wrapped on a standard aluminum or wood pattern. However, proper alignment of text is difficult to ensure during manual placement and often results in crooked lettering. Furthermore, letters and/or decorative features on the pattern may shift in the sand during filling and/or cause breakage of the hardened sand mold upon removal therefrom, resulting in excess metal, that is, imprecise finishes on the letters and decorative features.

More recently, additive manufacturing (that is, 3D printing) has emerged as a solution for many issues associated with traditional sand casting. Producing sand molds through additive manufacturing can significantly reduce the time and labor required for molding. Additive manufacturing may also enable greater geometric complexity in design features and allow for increased precision in molding letters and decorative features.

However, additive manufacturing may present additional challenges to the sand casting process. Complete memorial product molds would be very expensive to print because the process utilizes a large amount of consumables. Furthermore, generation of printed mold designs would require extensive development, reconfiguration, and testing. Scanning and conversion of an existing library of patterns to 3D printable mold designs is very time consuming due to the large volume of different patterns used for memorial products. Finally, there are safety risks associated with handling and transport of larger printed molds, for example, molds for complete memorial products.

As such, metal product manufacturers would benefit from processes for producing molds that combine the existing tooling of traditional sand casting with the advantages of additive manufacturing with respect to personalized features for metal products.

SUMMARY

In one embodiment, there is method for creating an assembled mold for casting a metal product, the method comprising receiving, by a processor, product design information for the metal product, wherein the product design information includes one or more customized features for the metal product; generating, by the processor, a product model for the metal product based on the product design information; generating, by the processor, printing instructions for a mold insert based on the product model, wherein the mold insert is related to the one or more customized features; accessing, by a manufacturing device, the printing instructions from the processor; and creating, by the manufacturing device, the mold insert by an additive manufacturing process according to the printing instructions, and mating the mold insert with a mold base to form the assembled mold, the mold base being produced with foundry sand using a casting flask and a molding pattern, and wherein the assembled mold comprises a mold cavity configured to cast the metal product including the one or more customized features.

In another embodiment, generating printing instructions for a mold insert comprises creating, by the processor, a mold insert model based on the product model; and creating, by the processor, the printing instructions for the mold insert based on the mold insert model.

In another embodiment, creating printing instructions for the mold insert comprises orienting and positioning, by the processing device, the mold insert model; determining, by the processing device, one or more support structures for the mold insert; determining, by the processing device, one or more slicing patterns for the mold insert; performing, by the processing device, path planning for the mold insert; and generating, by the processing device, machine instructions for the mold insert.

In another embodiment, determining one or more slicing patterns comprises determining an adaptive slicing pattern for the mold insert.

In another embodiment, the one or more customized features of the metal product comprise one or more of customized text, images, borders, and decorations formed according to a digital file of the product design information.

In another embodiment, creating the mold insert by an additive manufacturing process comprises printing the mold insert with sand.

In another embodiment, the mold insert comprises a peripheral surface having a draft angle.

In another embodiment, the draft angle is between about 0° and about 30°.

In another embodiment, the draft angle and a depth of the mold insert are configured to mate with a recess of the mold base to form the assembled mold.

In another embodiment, the depth of the mold insert is between about 0.5 inches and about 1.5 inches.

In another embodiment, the mold cavity is formed by one or more surfaces of the mold base and one or more surfaces of the mold insert.

In another embodiment, mating the mold insert with the mold base includes placing the mold insert within the mold cavity of the mold base which has previously been formed.

In another embodiment, mating the mold insert with the mold base includes filling the sand of the mold base around the mold insert which has been previously formed.

In another embodiment, the previously formed mold insert is baked or cured before the surrounding sand of the mold base is baked or cured.

In one embodiment, there is a system for creating an assembled mold for casting a metal product, the system comprising a processor; a non-transitory, computer-readable medium storing instructions that, when executed, causes the processor to: receive product design information for the cast metal product, wherein the product design information includes one or more customized features for the metal product, generate a product model for the metal product based on the product design information, and generate printing instructions for a mold insert based on the product model, wherein the mold insert is related to the one or more customized features; and a manufacturing device operably connected to the processor and configured to: access the printing instructions from the processing device, and create the mold insert by an additive manufacturing process according to the printing instructions, wherein the mold insert is configured to mate with a mold base to form an assembled mold, the mold base being produced with sand using a casting flask and a molding pattern.

In another embodiment, the instructions, when executed, further cause the processor to: create a mold insert model based on the product model; and create the printing instructions for the mold insert based on the mold insert model.

In another embodiment, the instructions, when executed, further cause the processor to orient and position the mold insert model; determine one or more support structures for the mold insert; determine one or more slicing patterns for the mold insert; perform path planning for the mold insert; and generate machine instructions for the mold insert.

In another embodiment, the instructions, when executed, further cause the processor to determine an adaptive slicing pattern for the mold insert.

In another embodiment, the one or more customized features of the metal product comprise one or more of customized text, images, borders, and decorations.

In another embodiment, the additive manufacturing process prints the mold insert with sand.

In another embodiment, the mold insert comprises a peripheral surface having a draft angle.

In another embodiment, the draft angle is between about 0° and about 30°.

In another embodiment, the draft angle and a depth of the mold insert are configured to mate with a recess of the mold base to form the assembled mold.

In another embodiment, the depth of the mold insert is between about 0.5 inches and about 1.5 inches.

In one embodiment, there is a method of casting a metal product comprising one or more customized features, the method comprising obtaining, by a processor, product design information for the metal product including one or more customized features; generating, by the processor, printing instructions for a mold insert based on the product design; creating, by a manufacturing device, the mold insert by an additive manufacturing process according to the printing instructions; creating a mold base based on the product design, wherein creating the mold base comprises: filling a casting flask with foundry sand over one or more molding patterns, and hardening the foundry sand by one or more of baking and curing to form the mold base; mating the mold insert with the mold base to form an assembled mold; and casting the metal product by adding molten metal to the assembled mold.

In another embodiment, the assembled mold comprises a mold cavity configured to cast the metal product including the one or more customized features.

In another embodiment, the one or more customized features of the metal product comprise one or more of customized text, images, borders, and decorations formed according to a digital file of the product design information.

In another embodiment, the mold insert comprises a peripheral insert surface having a draft angle.

In another embodiment, the draft angle is between about 0° and about 30°.

In another embodiment, the mold base comprises a recess sized and configured to receive the mold insert therein to form the assembled mold, wherein a peripheral recess surface comprises a draft angle configured to mate with the peripheral insert surface of the mold insert.

In another embodiment, a depth of the recess substantially corresponds to a depth of the mold insert.

In another embodiment, the depth of the mold insert is between about 0.5 inches and about 1.5 inches.

In another embodiment, the mold cavity is formed by one or more surfaces of the mold base and one or more surfaces of the mold insert.

In another embodiment, mating the mold insert with the mold base includes placing the mold insert within the mold cavity of the mold base which has previously been formed.

In another embodiment, mating the mold insert with the mold base includes filling the sand of the mold base around the mold insert which has been previously formed.

In another embodiment, the previously formed mold insert is baked or cured before the surrounding sand of the mold base is baked or cured.

BRIEF DESCRIPTION OF THE DRAWINGS

The accompanying drawings, which are incorporated in and form a part of the specification, illustrate the embodiments of the invention and together with the written description serve to explain the principles, characteristics, and features of the invention. Various aspects of at least one example are discussed below with reference to the accompanying drawings, which are not intended to be drawn to scale. In the drawings.

DETAILED DESCRIPTION

Figure 1:
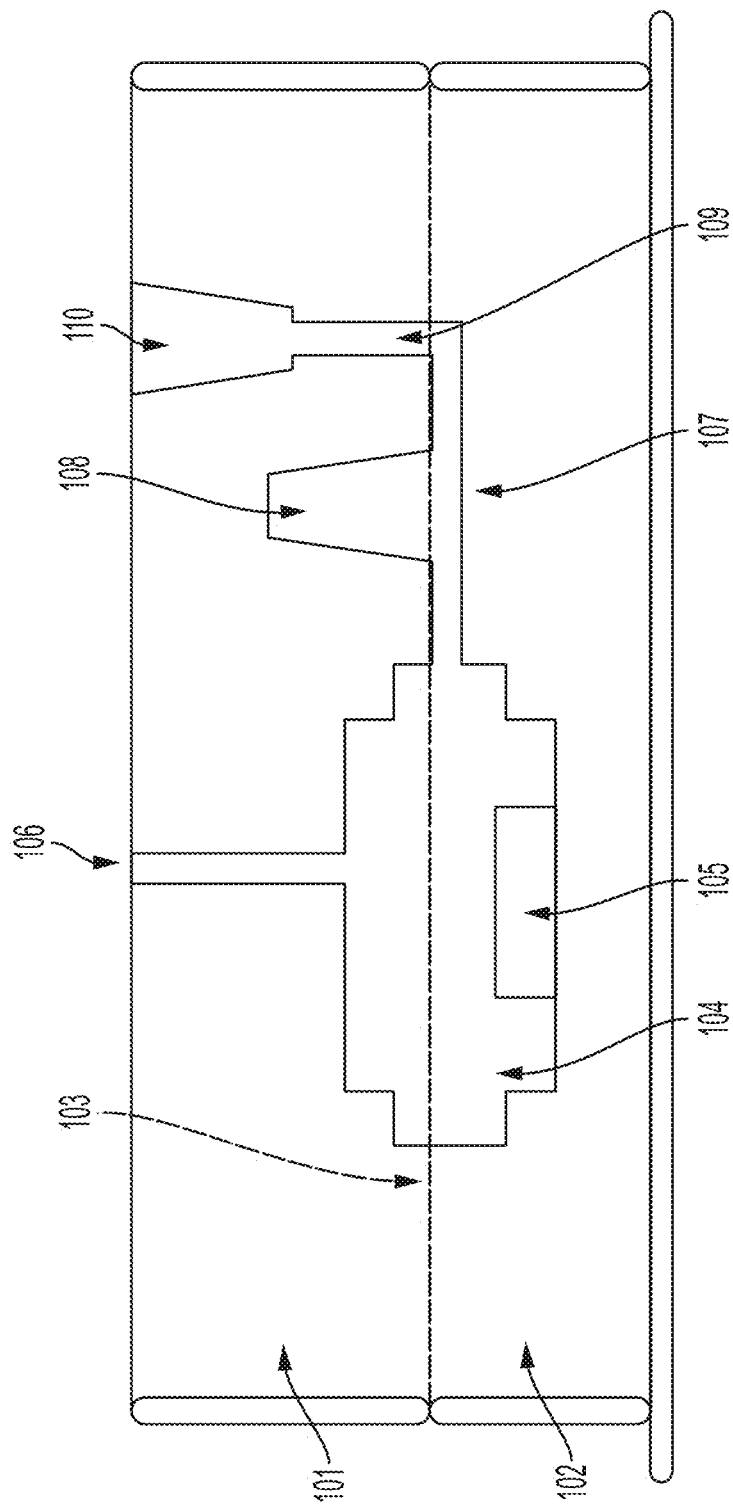
FIG. 1 depicts exemplary tooling for a conventional sand casting process.

This disclosure is not limited to the particular systems, devices and methods described, as these may vary. The terminology used in the description is for the purpose of describing the particular versions or embodiments only and is not intended to limit the scope.

As used in this document, the singular forms "a," "an," and "the" include plural references unless the context clearly dictates otherwise. Those having skill in the art can also translate from the plural form to the singular as is appropriate to the context and/or application. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices also can "consist essentially of" or "consist of" the various components and steps, and such terminology should be interpreted as defining essentially closed-member groups.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components. Similarly, a group having 1-5 components refers to groups having 1, 2, 3, 4, or 5 components, and so forth.

The term "about," as used herein, refers to variations in a numerical quantity that can occur, for example, through measuring or handling procedures in the real world; through inadvertent error in these procedures; through differences in the manufacture, source, or purity of compositions or reagents; and the like. Typically, the term "about" as used herein means greater or lesser than the value or range of values stated by ⅒ of the stated values, for example, ±10%. The term "about" also refers to variations that would be recognized by one skilled in the art as being equivalent so long as such variations do not encompass known values practiced by the prior art. Each value or range of values preceded by the term "about" is also intended to encompass the embodiment of the stated absolute value or range of values. Whether or not modified by the term "about," quantitative values recited in the present disclosure include equivalents to the recited values, for example, variations in the numerical quantity of such values that can occur, but would be recognized to be equivalents by a person skilled in the art.

The described technology generally relates to systems, methods, and computer program products for generating molds and/or related tooling ("metal casting molds" or "tooling") for creating metal products through a metal casting process. In some embodiments, the metal casting molds can be created using additive manufacturing techniques. In some embodiments, the metal casting molds can be used in an investment casting process using ferrous and/or non-ferrous metals. The methods and systems described herein can be used with various materials, including, without limitation, ferrous metals, non-ferrous metals, bronze, precious metals, aluminum, and/or combinations thereof, and/or the like. The methods and systems described herein can be used to create various products, including plaques, markers, memorials, signs, mechanical parts, and/or the like.

In some embodiments, a mold manufacturing system ("manufacturing system") may receive a product design to be manipulated/modified using scanning technologies and/or manual data manipulation to prepare files for use with additive manufacturing and other three-dimensional printing systems. The digital input may be in the form of engineering files, such as point cloud files, polygon mesh files, spline surface files, Boolean solid geometry files, or other related computer-aided design (CAD) files, raster/vector type files, and/or the like. In some embodiments, the manufacturing system may use stereolithography (*.stl) files for use with additive manufacturing systems.

A variety of additive manufacturing technologies will be known to a person of skill in the art. Such technologies include, for example, binder jetting, directed energy deposition, material extrusion, material jetting, powder bed fusion, sheet lamination, and vat photopolymerization. These technologies may use a variety of materials for an additive manufacturing process, including various plastics and polymers, metals and metal alloys, ceramic materials, metal clays, organic materials, and the like. Any additive manufacturing technology and substrate suitable for the production of molds of embodiments herein and compatible with the molding of metal products, or compatible with the manufacturing of molds that may be subsequently used to mold metal products, is within the scope of the present disclosure. Likewise, other methods of additive manufacturing and associated materials, whether presently available or yet to be developed, are intended to be included within the scope of the present disclosure.

Hybrid Sand Casting of Metal Products

As discussed herein, metal product manufacturers would benefit from processes for producing molds that combine the existing tooling of traditional sand casting with the advantages of additive manufacturing with respect to personalized features for metal products, for example, memorial products. Hybrid sand casting techniques would ideally reduce the time and effort required to convert a library of patterns over to a 3D printing platform and reduce the consumables required for production. Hybrid sand casting techniques must be carefully developed to integrate the traditional sand casting elements with the 3D printing elements. In certain embodiments, the drag, the cope, or both the drag and the cope are formed by processes that do not include 3D printing and are mated or configured to mate with at least one mold part or constituent that is formed by 3D printing.

Figure 2:
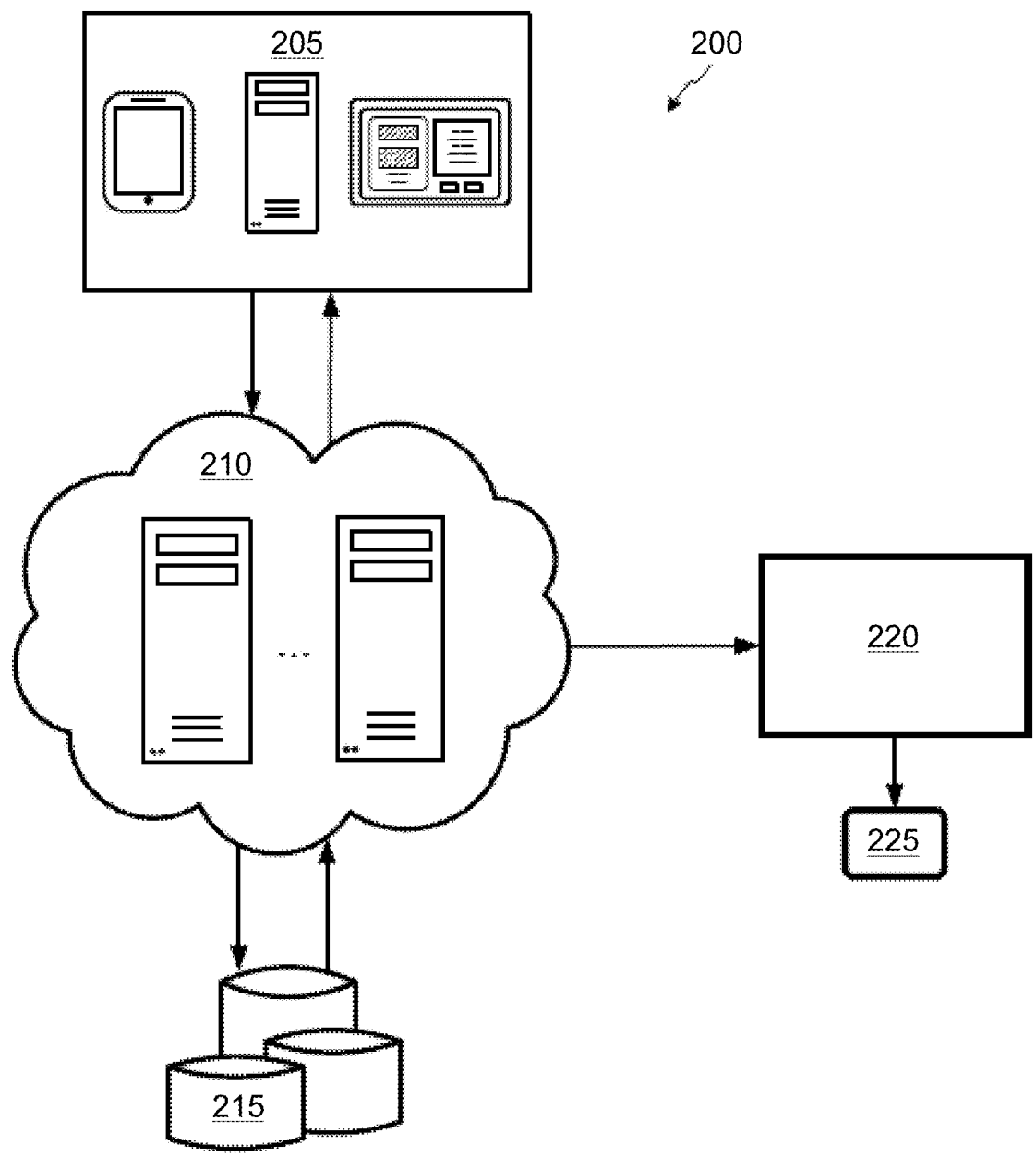
FIG. 2 depicts an illustrative manufacturing system in accordance with an embodiment.

Referring now to FIG. 2, an illustrative manufacturing system is depicted in accordance with an embodiment. As shown in FIG. 2, the manufacturing system 200 may include one or more system logic devices 210, which can generally include a processor, a non-transitory memory or other storage device for housing programming instructions, data or information regarding one or more applications, and other hardware, including, for example, the central processing unit (CPU) 1205, read only memory (ROM) 1210, random access memory (RAM) 1215, communication ports 1240, controller 1220, and/or memory device 1225 depicted in FIG. 12 and described below in reference thereto. In some embodiments, the system logic devices 210 can include server computing devices, workstation computing devices (personal computers or "PCs"), and/or the like. In some embodiments, the system logic devices 210 can be a part of a control system for a manufacturing device 220 for mold inserts, such as an additive manufacturing device or 3D printing device.

In some embodiments, the programming instructions can include a manufacturing application (the "manufacturing application") configured to, among other things, design and/or generate a mold insert. The system logic devices 210 can be in operable communication with client logic devices 205, including, but not limited to, server computing devices, personal computers (PCs), kiosk computing devices, mobile computing devices, laptop computers, smartphones, personal digital assistants (PDAs), tablet computing devices, or any other logic and/or computing devices now known or developed in the future.

In some embodiments, the manufacturing application can be accessible through various platforms, such as a client application, a web-based application, over the Internet, ane-commerce portal, and/or a mobile application (for example, a "mobile app" or "app"). According to some embodiments, the manufacturing application can be configured to operate on each client logic device 205 and/or to operate on a system logic device 210 accessible to client logic devices over a network, such as the Internet. All or some of the files, data and/or processes (for example, source information, de-identification processes, data sets, or the like) used for accessing and/or de-identifying information can be stored locally on each client logic device 205 and/or stored in a central location and accessible over a network.

In an embodiment, one or more data stores 215 can be accessible by the client logic devices 205 and/or the system logic devices 210. In some examples, the data stores 215 can include information sources having information used to design and/or generate a mold or customized portions of molds. For example, data stores 215 can include, without limitation, information from product catalogs, historical mold information, mold pattern information (e.g., mold templates, dimensions, cost information, and/or the like), e-commerce information, production information (for example, the SKU number), material information, and/or the like. In some embodiments, the data stores 215 can include information obtained from multiple data sources, including third-party data sources.

Although the one or more data stores 215 are depicted as being separate from the logic devices 205, 210, embodiments are not so limited. All or some of the one or more data stores 215 can be stored in one or more of the logic devices 205, 210.

The system logic devices 210 can receive product specifications for at least a portion of a product, for example, a ledger or other personalized or customized features of a metal product. The product specifications can be analyzed by the manufacturing application to generate mold information. In some embodiments, the product specifications can be in the form of a digital file. The mold information can be transmitted to a manufacturing device 220, such as an additive manufacturing system. The manufacturing device 220 can generate a mold insert 225 based on the mold information. For example, the manufacturing application can generate, look up, or otherwise obtain information from the product specifications and translate this data into mold information that can be used by the manufacturing device 220 to generate the mold insert 225. In some embodiments, the mold information can be in the form of a digital file, such as an *.stl file. The mold insert 225 can be used in combination with traditional sand casting processes, to generate a metal product. Furthermore, the mold insert 225 may be adapted for use with various additional types of metal casting processes, for example, shell molding, permanent mold casting, investment casting, and die casting, to produce metal products.

Figure 3:
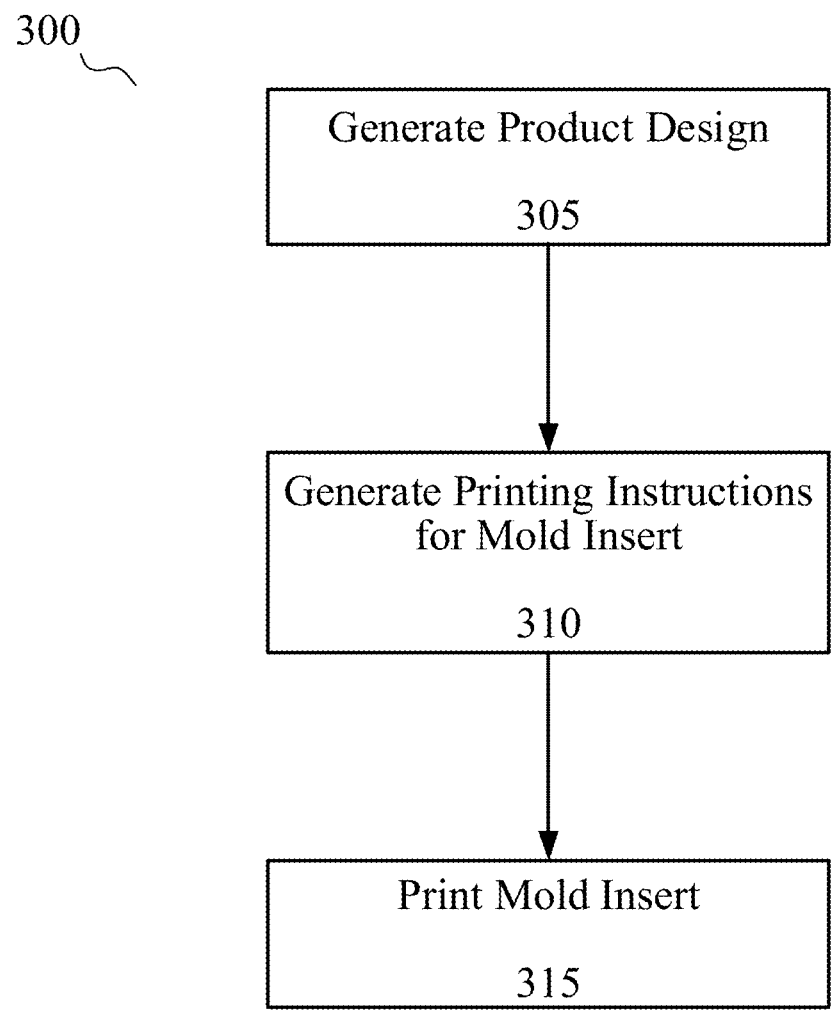
FIG. 3 depicts a flow diagram for an illustrative method of generating a mold insert for a metal product in accordance with an embodiment.

Referring now to FIG. 3, a flow diagram for an illustrative method of generating a mold insert for a metal product is depicted in accordance with an embodiment. The process 300 as described in FIG. 3 can be performed, for example, by a system such as manufacturing system 200 as described above. In certain implementations, particular components in system 200 can be configured to perform various steps of the process 300 as illustrated in FIG. 3. For example, logic devices 205, 210 can be used to generate product models and printing instructions, while manufacturing device 220 can be used to print one or more mold inserts 225.

As shown in FIG. 3, the process 300 comprises generating 305 a product design, generating 310 printing instructions for a mold insert based on the product design, and printing 315 a mold insert configured to mate with a mold base for the metal product (for example, a mold produced by traditional sand molding processes) based on the printing instructions.

In some embodiments, a product design generated in step 305 may take a variety of forms. For example, a product design may be embodied in a drawing, a sketch, a digital image, a portable document format (PDF) file, an order number, a product number, a SKU, a radio frequency identification (RFID) tag, a barcode, and/or the like. In some embodiments, a product design is embodied by a 3D model (for example, as shown in FIG. 5) generated using modeling applications and/or software. It should be understood that generating 305 a product design may comprise developing engineering requirements and/or specifications in a highly customized manner based on the order (that is, engineered to order). Accordingly, various technologies may be implemented in order to facilitate, expedite, and/or automate steps of generating 305 a product design based on demands or requirements from a customer. In some embodiments, generating 305 a product design comprises using artificial intelligence and/or machine learning systems. However, additional types of technologies may be implemented to generate 305 product designs as would be known to a person having an ordinary level of skill in the art. Key elements of generating 305 a product design are described in further detail with respect to FIG. 4.

Figure 4:
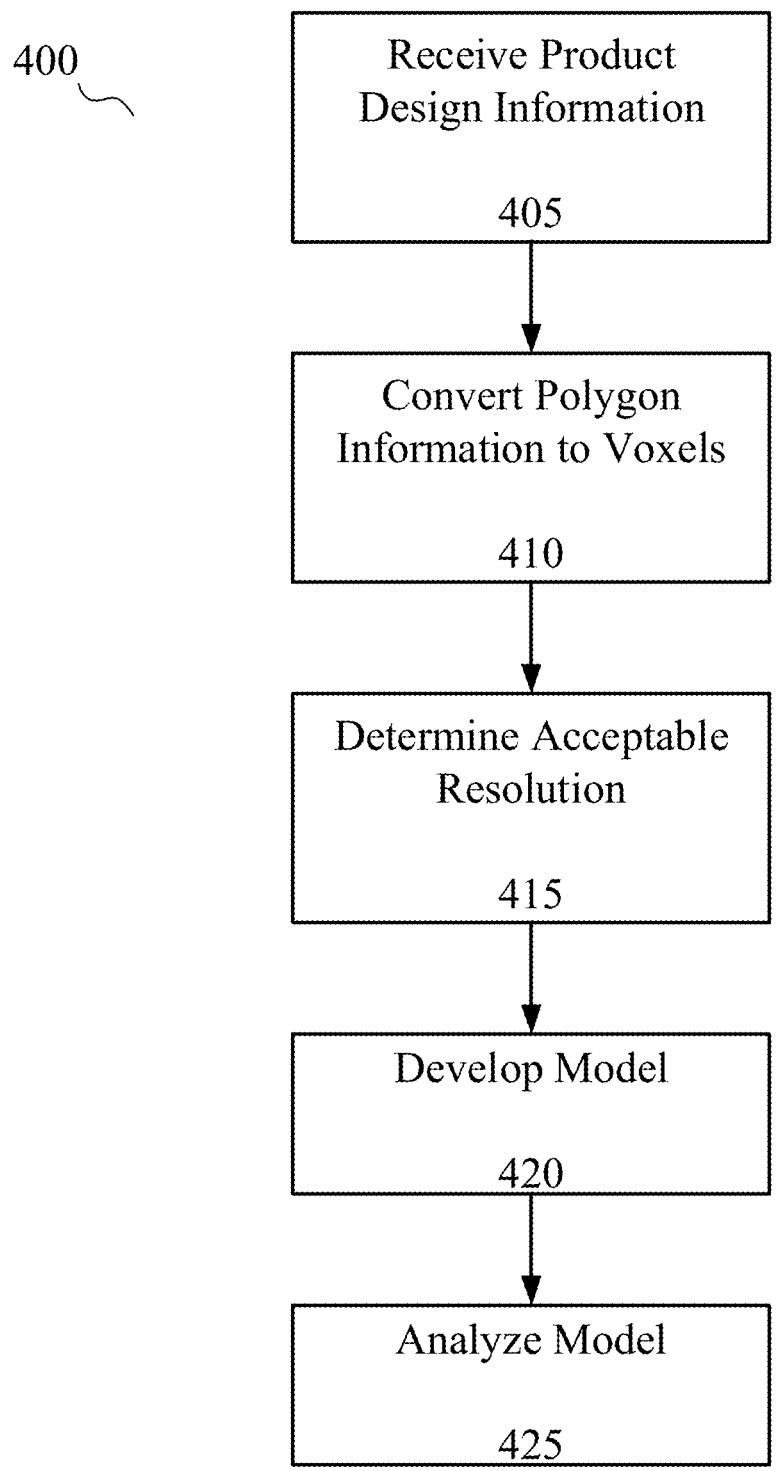
FIG. 4 depicts a flow diagram for an illustrative method of generating a product design in accordance with an embodiment.
Figure 5:
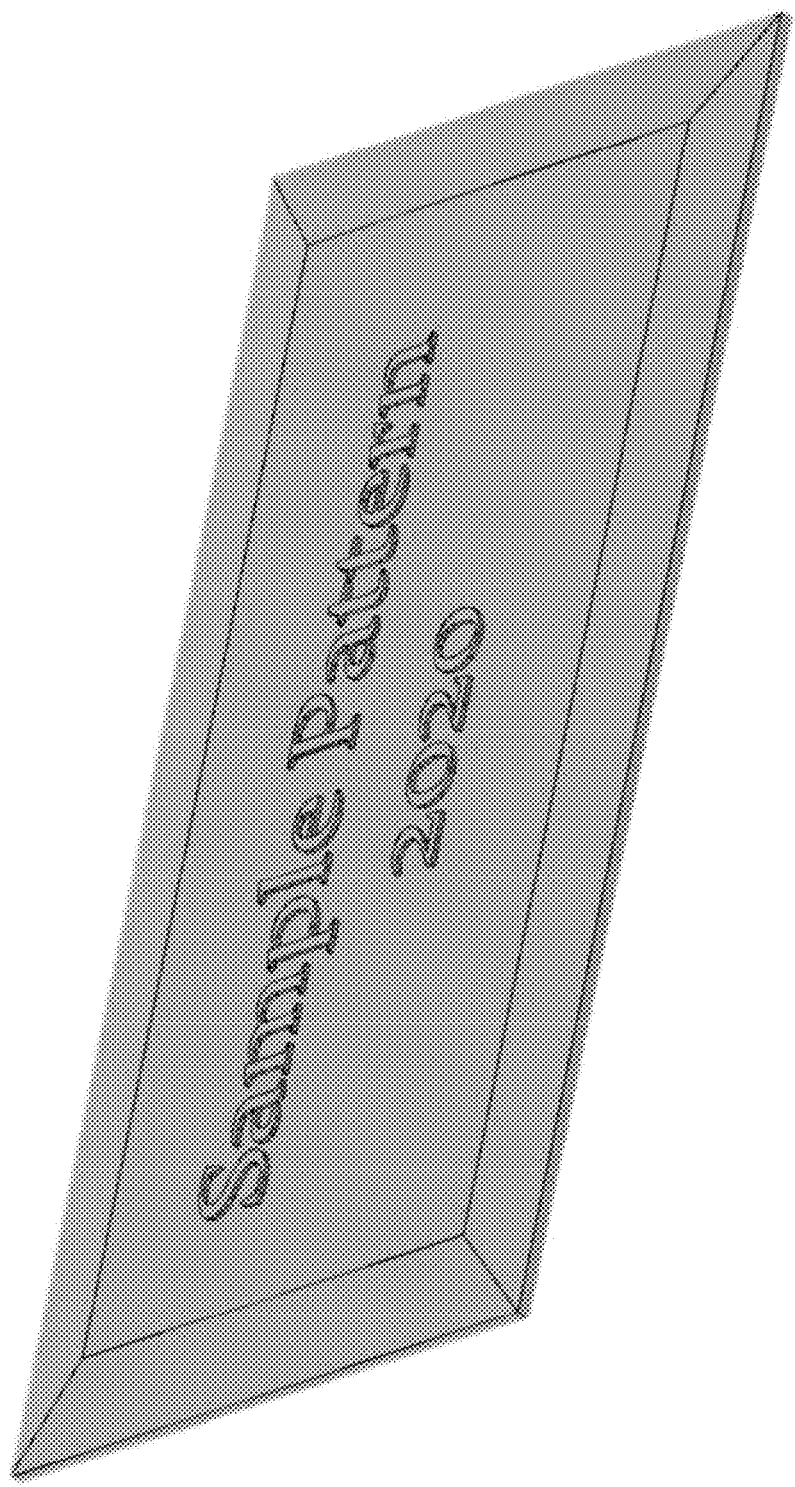
FIG. 5 depicts an exemplary model of a metal product to be cast in accordance with an embodiment.

Referring now to FIG. 4, a flow diagram for an illustrative method of generating a product design is depicted in accordance with an embodiment. For example, such a process 400 may embody the step of generating 305 a product design in the process 300 illustrated in FIG. 3. It should be understood that the process 400 may be used to generate a product design for a complete metal product. However, in some embodiments, the process 400 may be used to generate a product design for only a portion of a metal product. For example, a ledger or other personalized region of a metal product may be discretely designed by the process 400 based on known limitations of the complete metal product (for example, size, shape, material) but without a complete design thereof.

As shown in FIG. 4, a system running a modeling application or similar software and implemented on a processing device such as logic devices 205, 210, can receive 405 product design information for a product or a portion thereof to be modeled and cast. In certain implementations, the product design information can include a digital representation of the product such as a three-dimensional image file. In some examples, the digital representation can be loaded, created or otherwise obtained from, for example, a standard library of product files. For example, the product file can include product-specific information, such as shape, surface structure, material and associated material properties (for example, reflectance, color, gloss, anisotrophy, scattering properties, and translucency), and other related information. In some implementations, a user can alter the standard library files to include additional detail and/or personalized or customized features, such as text, images, adornments, decorations, or other features. For example, when creating a plaque, the user can load a standard product file representing various dimensions of the plaque (that is, length, width and depth), standard ornamentations or decorations (for example, specific borders, raised or lowered features, and other similar decorations), and other standard features. Additionally, the user can use an interactive editing tool to add additional detail, such as text (for example, a person's name, relevant dates, and other information related to the product being created), additional decorations (for example, images), and any other elements that the design system is configured to support.

In order to accurately create a three-dimensional model of the product, the product design information can be initially modeled as polygonal information (for example, a series of vector-based coordinates defining the extreme outer surfaces of the model). In certain embodiments, the polygonal information can then be converted 410 into voxel information. In computer design and modeling, voxels refer to volumetric elements, or elements that take up a definable space in a three-dimensional grid. Typically, a voxel is defined by its position relative to other voxels in a design. As a result, voxels are used to accurately represent spaces that are non-homogeneously filled more easily than polygonal information because polygons are typically only represented by a coordinate set, and not as they relate to other parts of a design. In certain implementations, converting 410 the polygonal information to voxel information can be performed on a pixel-by-pixel basis. In such an example, a pixel mask or other similar means for dividing the polygonal information can be applied to the product design information such that the product design is divided into an array of pixel-sized components. Each pixel-sized component can then be converted to voxel information using standard information and/or data conversion techniques.

During conversion 410, certain aspects and information related to the product should be maintained at a high level of accuracy (for example, within a specific sizing and spacing threshold to the original product). As such, the model should retain depth illusion, depth compression, shape compression, silhouette collapse, object order, and other similar aspects. Ensuring that the above features are maintained with a high level of accuracy ensures mold (and therefore product) repeatability.

Depending upon the size of the voxels (which can be dependent on, for example, the size of the pixel information used during the conversion as described above), the accuracy of the design software, and the manufacturing capabilities of the manufacturing device creating the mold insert, an acceptable resolution can be determined 415. For example, specific layer thicknesses and surface roughness values can be determined for a specific model. In order to accurately determine 415 the resolution, additional information, such as the size of the particulate (for example, foundry sand or casting sand) being used to create the mold insert, can be considered. Based upon the size of the particulate, a certain level of resolution might not be easily achieved when creating the mold.

After the polygon information is converted 410 and the resolution is determined 415, the processing device can develop 420 the model as a 3D model file stored, for example, on a computer readable medium operably connected to the processing device. The model can then be analyzed 425 by, for example, the designer of the model. In certain implementations, the processing device can be configured to automatically analyze 425 the model to determine whether the dimensions of the model, shapes, features, text, resolution, and other related parameters and properties were properly converted and modeled. An exemplary model of a metal product to be cast is depicted in FIG. 5 in accordance with an embodiment.

After the product design is generated 305, the system can generate 310 printing instructions for a mold insert associated with the product based on the product design. For example, scanning technologies such as model slicing, alone or in combination with manual data manipulation, can be used to prepare a file with one or more printing instructions that can be used by additive manufacturing devices. For instance, printing instructions for a mold insert can be generated in the form of files (for example, *.stl files) for use with three-dimensional printer devices. In some embodiments, printing instructions are generated using modeling applications and/or software. Key elements of generating 310 printing instructions are described in further detail with respect to FIG. 6.

Figure 6:
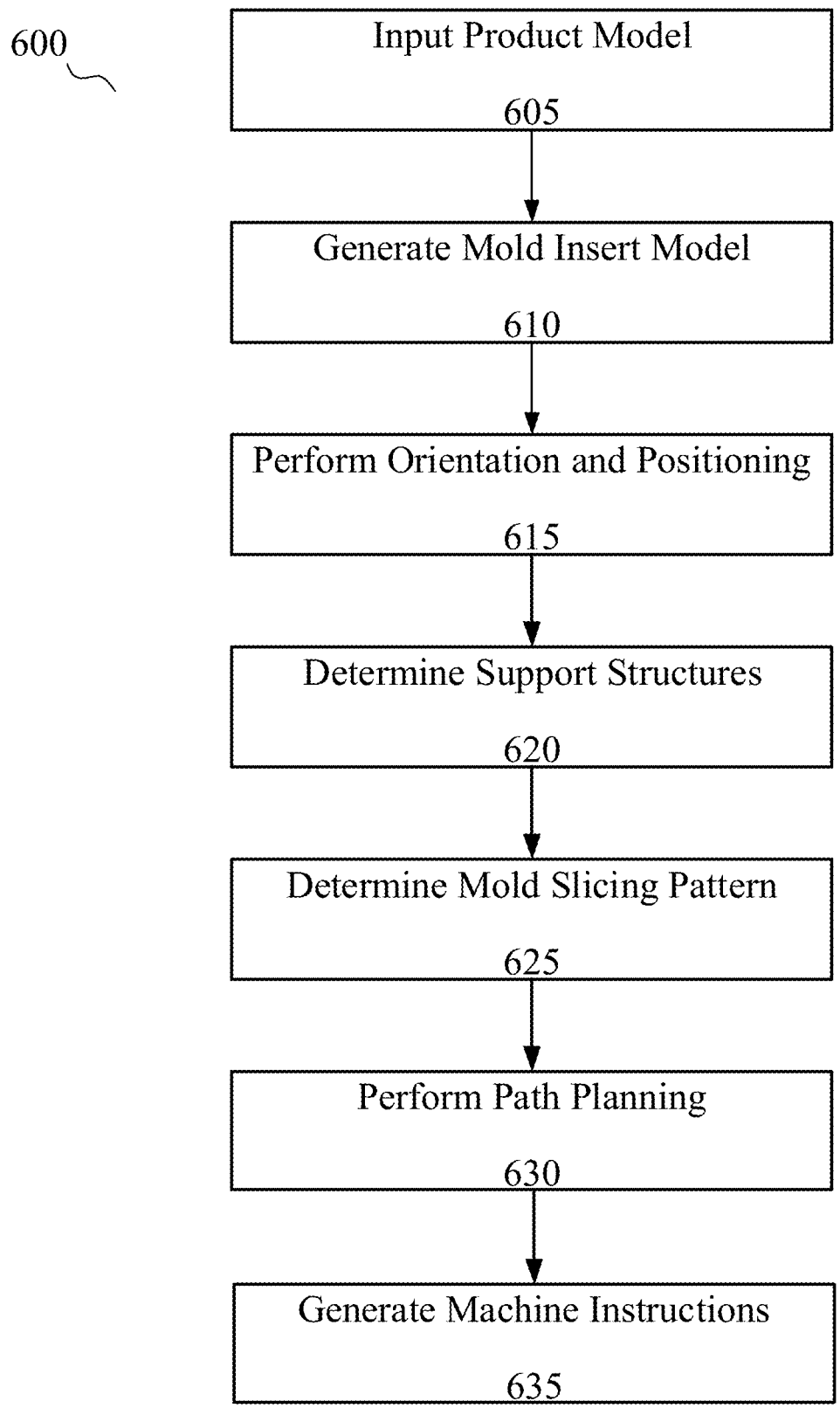
FIG. 6 depicts a flow diagram for an illustrative method of generating printing instructions for a mold insert in accordance with an embodiment.

Referring now to FIG. 6, a flow diagram for an illustrative method of generating printing instructions for a mold insert based on a digital product design is depicted in accordance with an embodiment. For example, such a process 600 may embody the step of generating 310 printing instructions in the process 300 illustrated in FIG. 3. It should be understood that the process 600 may be used to generate printing instructions for a mold insert configured to mate with a product mold for a metal product. For example, a product mold and the mold insert may be mated together to form an assembled mold for a metal product or a portion thereof. For example, the mold insert may be directed to a ledger or other customized region of the metal product while the product mold may be directed to generic design elements or regions of the metal product. The customized region may include one or more customized features such as text, images, borders, adornments, decorations, ornamentations, and/or other standard features.

As shown in FIG. 6, a processing device such as logic devices 205, 210 as described above or a processing device integrated into, for example, manufacturing device 220, can initially input 605 a product model (for example, a model generated in step 305 of the process 300 of FIG. 3 and as described by the process 400 of FIG. 4). For example, the product may comprise a 3D model of a metal product to be cast as shown in FIG. 5. It should be noted that, when creating a mold insert for casting a product, the model of the product can be used as a template to create the mold insert. Thus, the mold insert is shaped as a negative of at least a portion of the model, defining open spaces associated with solid features of the product, and having solid spaces associated with open features of the product.

Referring again to FIG. 6, after the model is input 605 and loaded, the processing device can generate 610 a mold insert model representing the various features of a portion of the product being cast. In some implementations, depending upon the number and location of personalized or customized features of the product to be cast, multiple mold inserts can be created and mated with a product mold prior to casting. In some implementations, depending upon the size and shape of the product to be cast, multiple product molds or mold portions may be required for casting, and each mold insert may be mated with one of the product molds for casting.

Figure 7A:
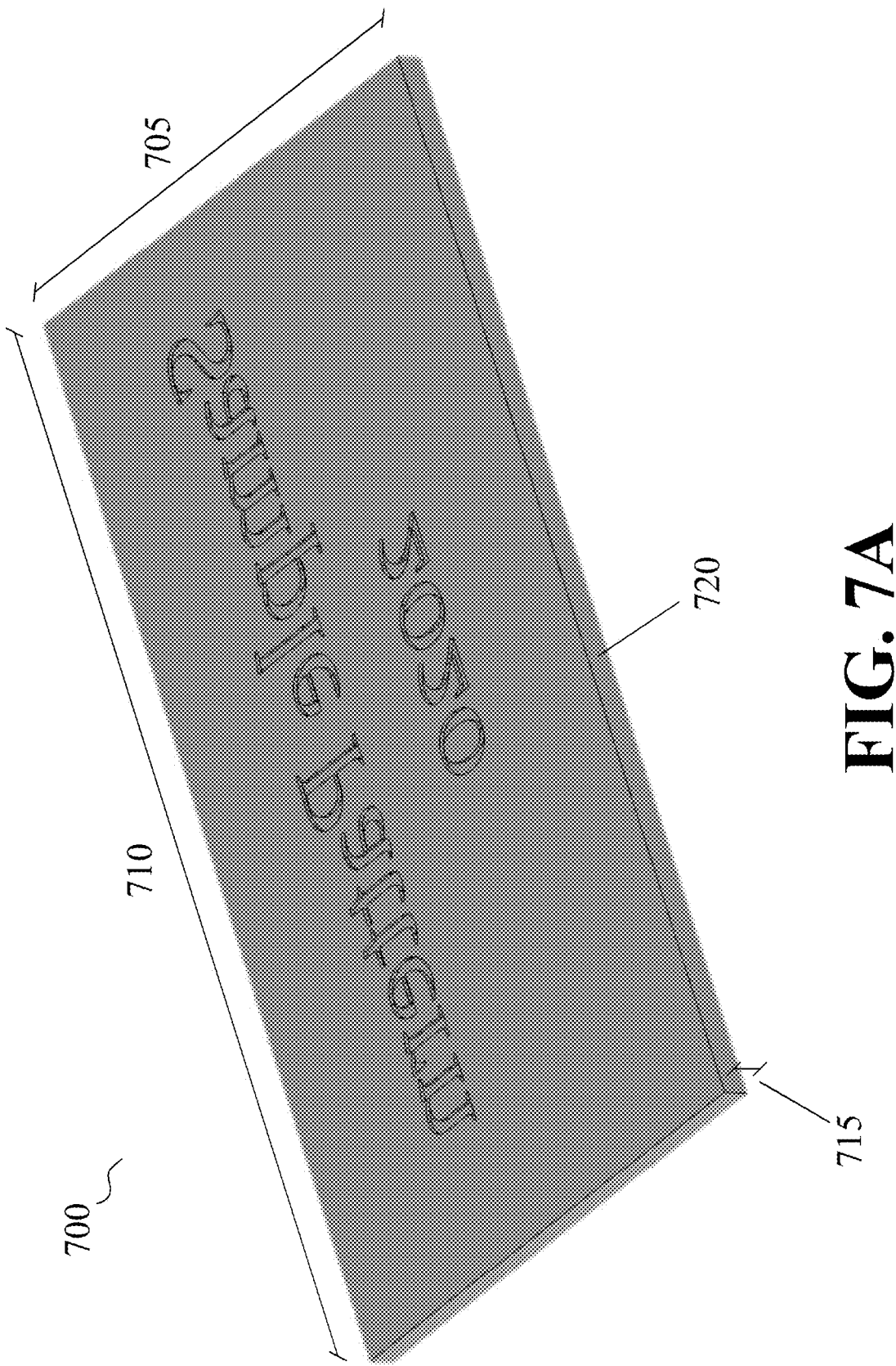
FIG. 7A depicts an exemplary mold insert model in accordance with an embodiment.

An exemplary mold insert model is depicted in FIG. 7A in accordance with an embodiment. As shown, the mold insert 700 may represent a negative of a portion of the model of the product, for example, a ledger portion, and may exclude additional regions of the model of the product, for example, a frame and/or border as shown in the product model of FIG. 5. The mold insert 700 may include a negative representation of one or more customized features of the product model such as text, images, borders, adornments, decorations, ornamentations, and/or other standard features. It should be understood that the mold insert 700 is configured to be mated and inset within a product mold for a larger region and/or an entirety of the metal product. Accordingly, the length 705, width 710, and depth 715 of the mold insert 700 may be set by one or more predetermined parameters of the hybrid sand casting system as further described herein. For example, the length 705, width 710, and depth 715 may be selected to match a set of standardized dimensions for the mold insert. In some embodiments, the length 705 is about 12 inches, the width 710 is about 24 inches, and the depth 715 is about 0.625 inches. However, the dimensions may be varied as would be apparent to a person having an ordinary level of skill in the art. In some embodiments, one or more sets of standardized dimensions may be stored by the processing device and one of the sets of standardized dimensions may be selected therefrom. In some embodiments, the set of standardized dimensions is selected based on a size of the metal product. In some embodiments, the set of standardized dimensions is selected based on any additional information known to the processing device, for example, dimensions of the customized features and/or location of the customized features. In some embodiments, the set of standardized dimensions is configured to match the dimensions of an extended core volume of a modified pattern and/or the dimensions of an insert recess of a drag or cope formed with the modified pattern as further described herein.

It should also be understood that the length 705 and width 710 of the mold insert 700 may match the length and width of the corresponding region of the model of the product. Correspondingly, the inserts can be printed at prescribed layer thickness based on a known sand and binding agent. Accordingly, the size and scale and of individual features of the mold insert 700 (for example, negative impressions of the letters) may match the size and scale of the corresponding features of the model of the product. The depth 715 of the mold insert 700 may not match a corresponding depth of the model of the product because the mold insert 700 is intended to be inset within a product mold for molding of the product such that the depth 715 of the mold insert is not germane to characteristics of the resulting metal product. Accordingly, the depth 715 may be selected to mate with and align with an upper surface of an insert recess of a drag or cope for molding the metal product. In some embodiments, the depth 715 may be predetermined for each set of dimensions of the mold insert. In some embodiments, the depth 715 for each set of dimensions of the mold insert may be uniform such that mold inserts 700 consistently match insert recesses of product molds produced by the methods herein. For example, the depth 715 may be set as about 0.625 inches. However, other depths may be selected as would be apparent to a person having an ordinary level of skill in the art, for example, about 0.5 inches, about 0.625 inches, about 0.75 inches, about 0.875 inches, about 1 inch, about 1.125 inches, about 1.25 inches, about 1.375 inches, about 1.5 inches, greater than about 1.5 inches, or individual values or ranges therebetween.

In some embodiments, the mold insert 700 may also include angled peripheral surface 720, that is, a 'draft'. The angle of the draft 720 may be selected to mate with and align with a corresponding draft of an insert recess of a drag or cope for molding the metal product. In some embodiments, the angle of the draft 720 may be predetermined for each set of dimensions of the mold insert. In some embodiments, the angle of the draft 720 for each set of dimensions of the mold insert may be uniform such that mold inserts 700 consistently match insert recesses of modified product molds produced by the methods herein. For example, the angle of the draft may be about 5°. However, other draft angles may be selected as would be apparent to a person having an ordinary level of skill in the art, for example, approaching 0°, about 1°, about 2°, about 3°, about 4°, about 5°, about 10°, about 15°, about 20°, about 25°, about 30°, greater than about 30°, or individual values or ranges therebetween.

In some embodiments, the depth 715 and the draft 720 may be selected together in order to facilitate (1) easy mating of the mold insert 700 and the insert recess; and (2) a precise mating between the mold insert 700 and the insert recess. In some embodiments, a proportion or ratio between the depth 715 and the draft 720 may be particularly advantageous for easy and precise mating between the mold insert 700 and the insert recess. For example, a ratio of about 0.125 inches depth per degree draft may be particularly advantageous in this regard. Accordingly, a depth of about 0.625 inches and a draft of about 5° may be selected in order to achieve and easy and precise mating. However, additional combinations of depth 715 and draft 720 meeting this ratio may be similarly advantageous. Furthermore, additional ratios may be advantageous as would be apparent to a person having an ordinary level of skill in the art. Accordingly, sufficient mating of the mold insert 700 with a corresponding insert recess may be ensured by selection of the depth 715 and draft 720 of the mold insert 700.

In some embodiments, the depth 715 and/or draft 720 may also be selected to improve castability. For example, depths outside of a particular range may lead to difficulties in casting metal products, for example, imprecise features or deformities on the metal product, and/or damage to the mold insert 700 during casting. In some embodiments, the depth 715 and/or draft 720 may also be selected to improve yield. In some embodiments, the depth 715 and/or draft 720 may also be selected to improve cycle time for production of the mold insert 700.

The mold insert can include features that assist or otherwise improve the handling and usability of the mold insert during the manufacturing process. In some embodiments, the mold insert is formed and subsequently placed on, placed within, or associated with an insert recess in a mold base, cope, or drag which has previously been baked, cured, or otherwise hardened. Such a process can, depending on the configuration of the plant and equipment, improve productivity by separating the steps that are necessary to form the final mold. Alternatively and in different embodiments, however, and again depending on the exact configuration of the plant and equipment, the inventors discovered that the mold insert can actually be formed integrally within the mold base, cope, or drag. Such an embodiment is described more fully in the subsequent paragraph of the disclosure.

Figure 7B:
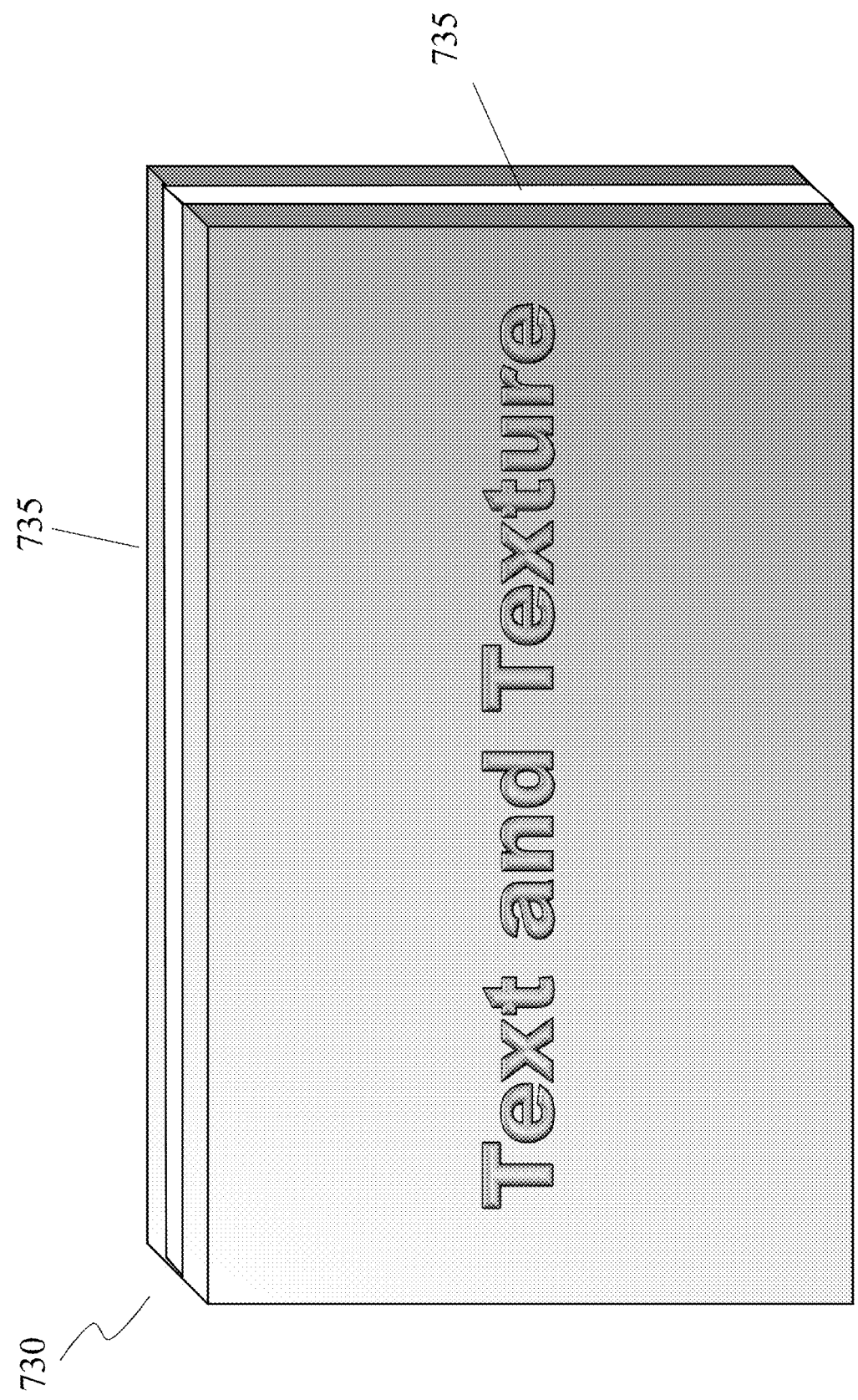
FIG. 7B depicts an exemplary mold insert model in accordance with an embodiment.

Referring briefly to FIG. 7B, in certain embodiments, the edges of the mold insert 730 comprise one or more channels 735 configured to enhance the interlocking with a mold base, cope, drag, or any surrounding body of foundry sand. In such a configuration, the mold insert 730 is formed and placed within a mold box (sometimes referred to as a flask). Next, the mold box is filled with sand, which can be virgin sand or reclaimed sand, and such sand includes components such as binders that will allow it to harden into a sand mold. When the sand is filled into the mold box, a small portion of that sand impinges into the channel 735, thereby mechanically interlocking the mold insert into the surrounding mold base (also referred to as a cope or drag, and which is not shown in FIG. 7B). When such a process is followed, the negatively molded features of the mold insert 730 are configured so that they are exposed on at least one outer surface of the mold base, cope, or drag to thereby make the required impression on the molten metal which will be subsequently filled into the mold cavity. The entire structure of the mold insert 730 and the surrounding mold base, cope, or drag is then hardened together when the requisite bodies of sand are hardened by baking or curing. For example, the mold insert 730 can be formed and cured, placed within the mold box, and then surrounded by molding send, and then the entire body is hardened by baking.

In some embodiments, the channel may be approximately 0.125 inches wide. However, other widths may be selected as would be apparent to a person having an ordinary level of skill in the art. Specifically, the width may be based on the depth of the mold insert for example, about 10%, about 15%, about 20%, about 25%, about 30%, about 35%, about 40%, about 45%, about 50%, greater than about 50%, or individual values or ranges therebetween. One of ordinary skill in the art will note that the depth of a channel will vary based on the draft angle. The channel 735 can also include additional structural features to enhance the integration or interlocking that occurs when the surrounding mold sand is hardened, such as waves, zig-zags, notches, gear-like teeth, random shapes, waveform shapes, or combinations of one or more of the preceding shapes.

Referring again to FIG. 6, the processing device can orient and position 615 the mold insert model such that a mold insert can be created representing the various features of a portion of the product being cast. The processing device can also determine 620 any support structures that might be required for providing structural integrity to the mold insert during the casting process. For example, internal support and shaping structures can be determined 620 for the mold insert being created.

The processing device can also determine 625 a mold insert slicing pattern. The mold insert slicing pattern can be configured such that it reduces eliminated geometry and staircase effects from the additive manufacturing process. As noted above, the additive manufacturing process can use a particulate such as foundry sand to create the mold insert. As such, the various features of the mold insert may not be perfectly smooth. Rather, they can only be as smooth as the size of the particulate being used. As such, by accurately determining 625 a mold insert slicing pattern, staircase effects can be reduced.

Figure 8:
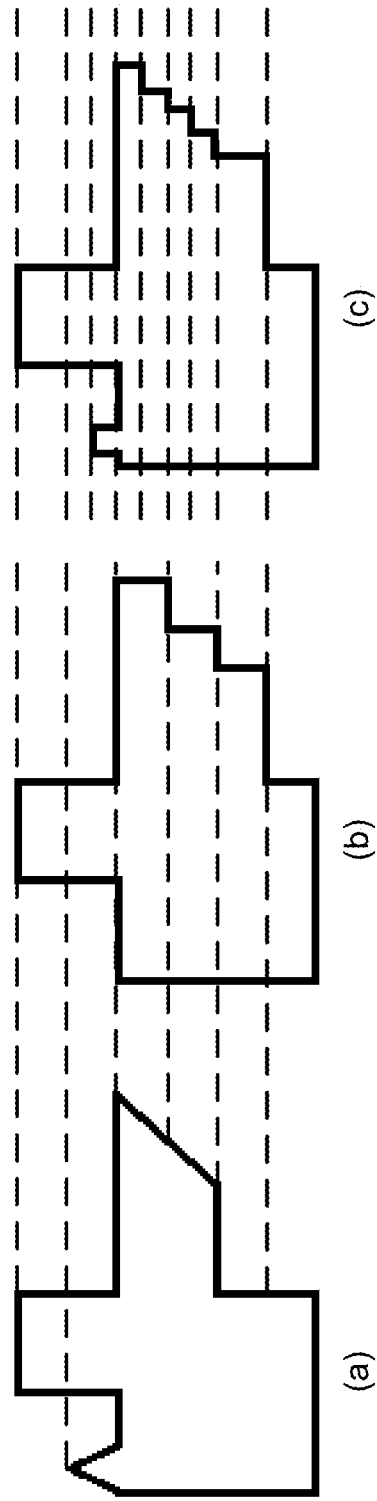
FIG. 8 depicts a sample illustration of slicing effects and various slicing techniques.

For example, FIG. 8 depicts a sample illustration of slicing effects and various slicing techniques. Item (a) in FIG. 8 represents the original model, including various geometric features. Item (b) represents a uniformly sized slicing pattern. Depending upon the design of the product being cast, a uniform slicing pattern can result in an acceptable loss of quality and finish, while reducing the overall time to create the mold insert. Item (c) represents an adaptive slicing pattern. As illustrated, such a pattern provides a higher level of detail by narrowing the slices where appropriate, thereby increasing the total number of slices in the mold insert. In such an adaptive slicing pattern, more detail from the original model can be maintained as compared to, for example, the uniform slicing pattern. It should be noted that the slicing patterns shown in FIG. 8 are provided by way of example only, and additional slicing patterns can be used.

Referring again to FIG. 6, the processing device can perform 630 path planning for the mold insert creation process. In certain implementations, the path planning includes specific movements and instructions for causing the manufacturing device to produce the mold insert. Typically, manufacturing devices include optimization software for performing accurate path planning specific to the functions and capabilities of that specific manufacturing device.

The processing device can further optimize any number of features of the mold insert design in relation to a product mold. In certain implementations, optimizing the mold insert design may include defining one or more features based on known parameters of a product mold in order to impart one or more advantages to the resulting assembled mold. For example, optimizing may include determining a pour cup strategy, determining a venting strategy, and determining other optimization parameters, such as angling the product mold or mold insert, modifying the orientation of the product mold or mold insert, and other similar ideas and concepts. The mold insert design may thus be modified in a variety of manners that do not affect the mating of the mold insert with the product mold.

The processing device can generate 635 the actual machine instructions for creating the mold insert and store those machine instructions on a computer readable medium operably connected to the manufacturing device for execution by the manufacturing device when creating the mold insert. In the case of a metal product having a plurality of customized regions, the process as described in FIG. 6 can be repeated to generate machine instructions for creating additional mold inserts.

Referring once again to FIG. 3, after generating 310 the printing instructions as described herein, the process 300 comprises printing 315 the actual mold insert. For example, an additive manufacturing process can be used to create the mold insert from, for example, foundry sand or another similar particulate based on the printing instructions. After creation, the printed mold insert can be removed from the manufacturing device, cleaned, and inspected to ensure quality control. The inspection can be done visually by a human, or with an optical scanning device such as a laser scanner or the like. If the mold insert passes inspection, the mold insert may be used as part of a metal casting process to generate a metal product, such as a product formed from a bronze casting process.

Because the molds are typically destroyed when removing the cast product, creating a custom mold for each custom product, such as a memorialization product like a bronze plaque, can be expensive and time consuming when done one at a time by hand. However, using the process as described herein, a person can design a product, generate printing instructions for a mold insert, and print the mold insert by an efficient process carried out by a processing device. One or more steps can also be performed without constant oversight by a user, for example, overnight, thereby reducing the amount of time a single employee spends on each product while maximizing efficiency.

Figure 9:
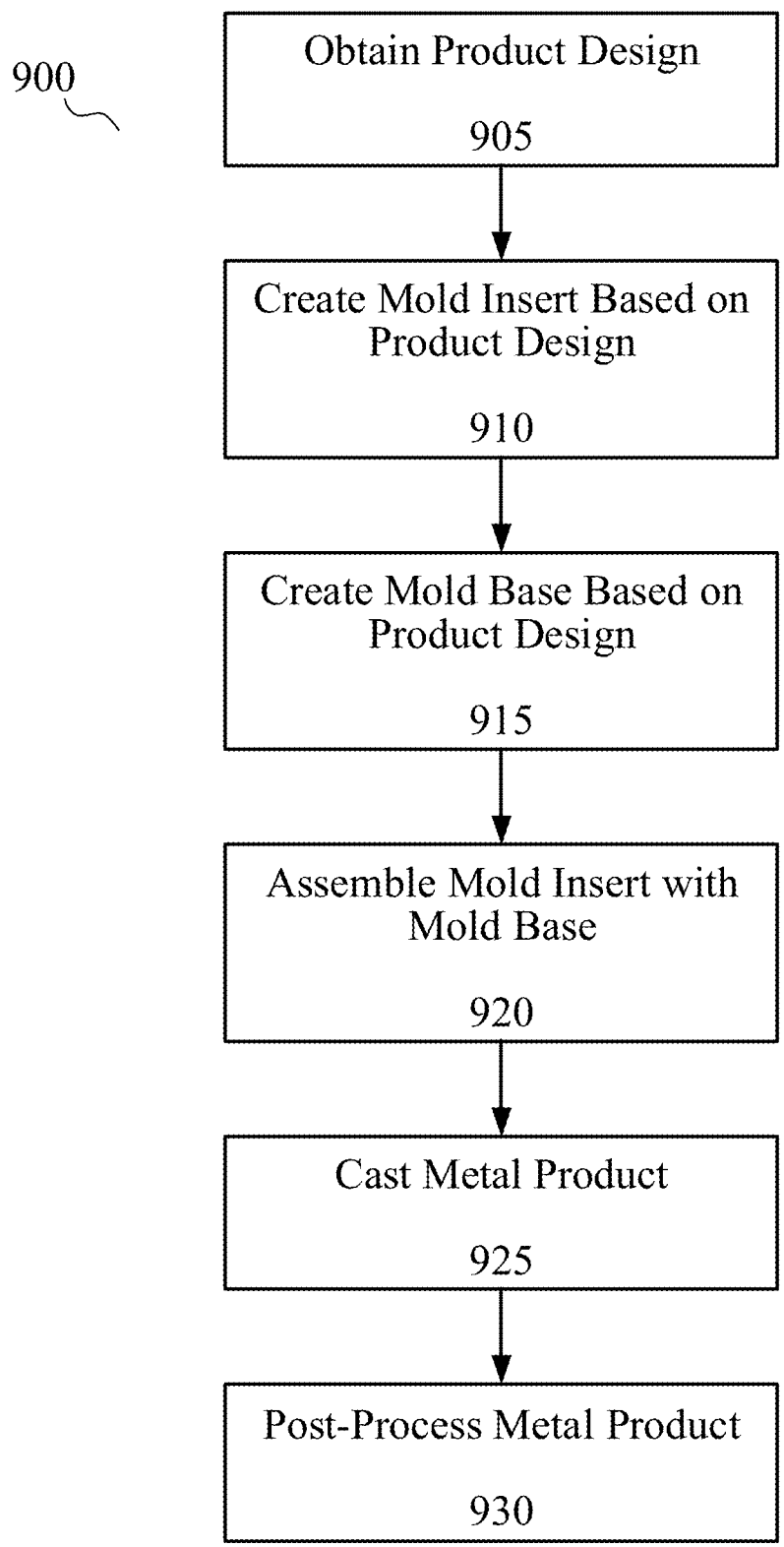
FIG. 9 depicts a flow diagram for an illustrative hybrid method of casting a metal product in accordance with an embodiment.

Referring now to FIG. 9, a flow diagram for an illustrative hybrid method of casting a metal product is depicted in accordance with an embodiment. The process 900 as described in FIG. 9 can be performed, for example, by utilizing a mold insert 700 as shown in FIG. 7 produced by the process 300 of FIG. 3 as described herein in combination with modified processes of traditional sand casting. As shown in FIG. 9, the process 900 comprises obtaining 905 a product design, creating 910 a mold insert based on the product design, creating 915 a mold base based on the product design, assembling 920 the mold insert with the mold base to form an assembled mold, casting 925 the metal product with the assembled mold, and post-processing 930 the metal product.

Obtaining 905 a product design may be performed by any of the various manner described herein. In some embodiments, obtaining 905 a product design comprises generating 305 a product design as described with respect to the process 300 of FIG. 3.

Creating 910 a mold insert may be performed by any of the various manner described herein. In some embodiments, creating 910 a mold insert comprises generating 310 printing instructions for a mold insert and printing 315 the mold insert as described with respect to the process 300 of FIG. 3.

Creating 915 a mold base may be performed using tooling for traditional sand casting techniques with modifications to accommodate the mold insert. For example, FIG. 1 depicts exemplary tooling for a traditional sand casting processes. As described herein, in a typical sand casting process, a solid replica of the metal product to be cast is fashioned from a material such as aluminum or wood known as a 'pattern'. For example, a pattern for the metal according to the model of FIG. 5 may be substantially similar in appearance to the model of FIG. 5 except that the pattern is constructed from aluminum or wood. Additionally, the replica may be divided into two or more parts, for example, split along a parting line into upper and lower halves that can be arranged in the cope and drag, respectively. Sand, for example, foundry sand including a binding agent, is poured and tightly packed into the cope and drag over the pattern and hardened (for example, by curing or baking). Thereafter, the patterns are removed and the cope and drag are mated and locked together to form the mold cavity, which is a negative impression of the metal product. Additional features, for example, a pouring cup, runner, a riser, a gate, one or more vents, cores, and the like, may be implemented in the mold as would be understood by a person having an ordinary level of skill in the art.

Figure 10:
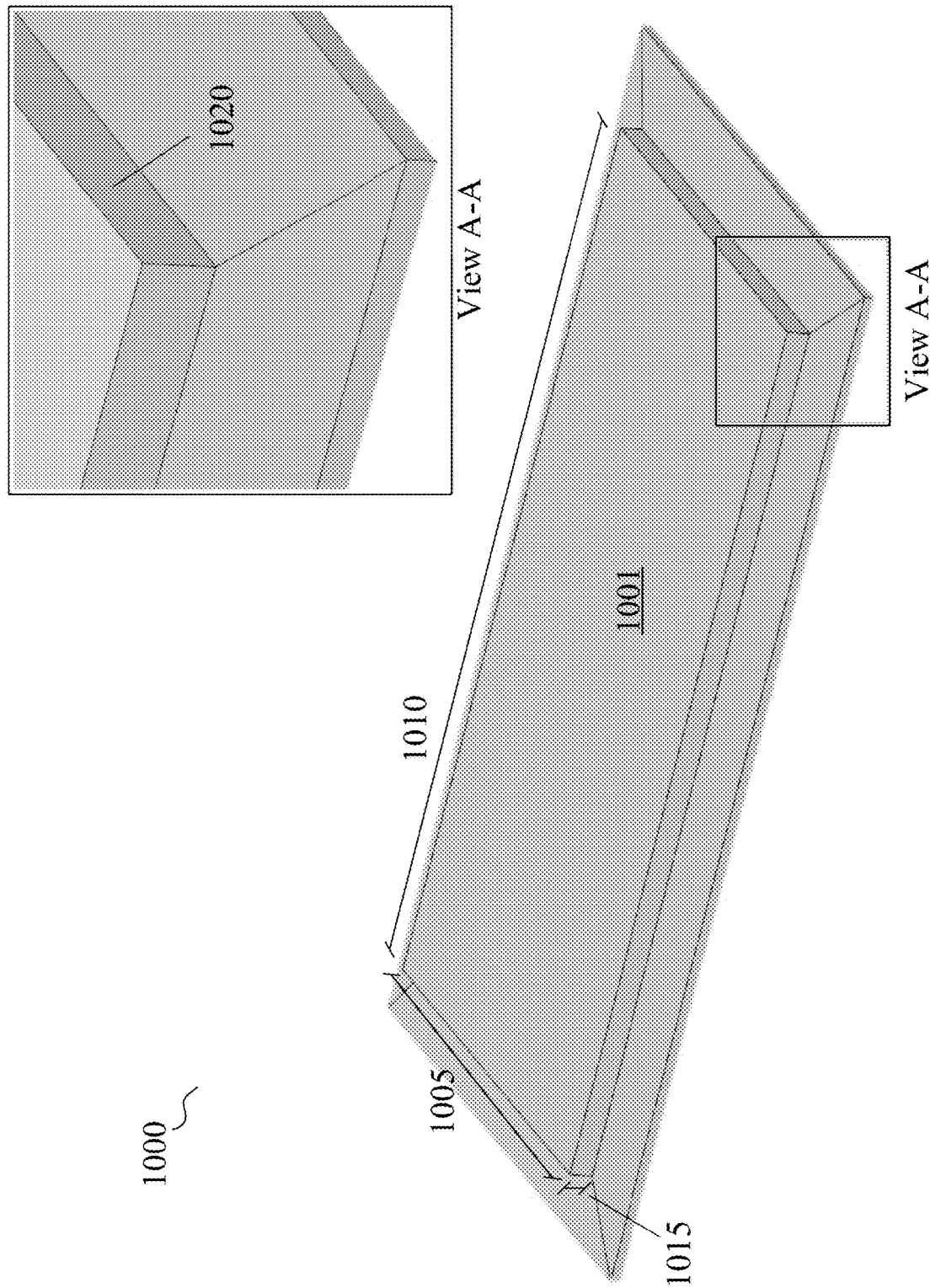
FIG. 10 depicts an exemplary modified pattern for a metal product in accordance with an embodiment.

Accordingly, creating 915 a mold base according to the method 900 may comprise utilizing a modified pattern. For example, FIG. 10 depicts an exemplary modified pattern for a metal product in accordance with an embodiment. The modified pattern 1000 of FIG. 10 corresponds to the same metal product as shown in FIG. 5. While a traditional pattern would appear substantially similar to FIG. 5, the modified pattern 1000 of FIG. 10 is differentiated therefrom. As shown in FIG. 10, the modified pattern 1000 includes an extended core 1001 that forms an additional volume of the pattern beyond the footprint of the metal product to be cast. The extended core 1001 may have dimensions substantially corresponding to a mold insert to be used therewith. For example, the extended core 1001 may have a length 1005 equal to the length 705 of the mold insert 700, a width 1010 equal to the width 710 of the mold insert 700, and a depth 1015 equal to the depth 715 of the mold insert 700. Furthermore, the extended core 1001 may include a draft 1020 substantially corresponding to a draft of a mold insert to be used therewith. For example, the extended core 1001 may have a draft 1020 equal to the draft 720 of the mold insert 700. It should also be understood that the modified pattern 1000 also differs from a traditional pattern because the modified pattern 1000 is produced without the personalized features of the metal product, for example, the text as shown in FIG. 5.

Figure 11:
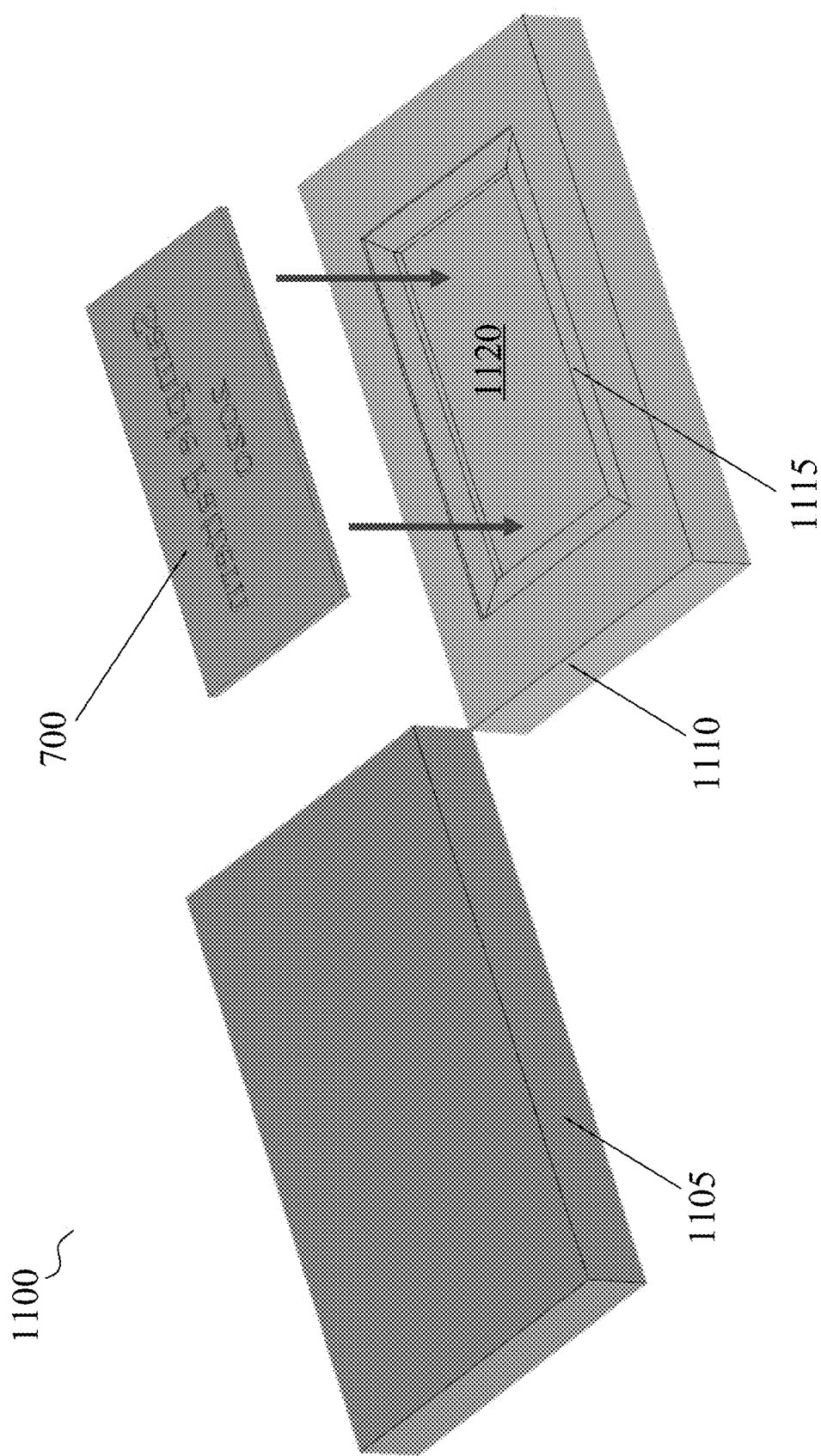
FIG. 11 depicts an illustrative mold base created with the modified pattern of FIG. 10 in accordance with an embodiment.

As with a traditional pattern, creating 915 a mold base may comprise positioning the modified pattern 1000 within the cope and/or drag, pouring foundry sand over the modified pattern 1000 to fill the cope and/or drag and tightly packing the foundry sand. The sand may then be hardened by curing or baking to solidify the sand impression, thereby producing the mold base. Thereafter, the modified pattern 1000 may be removed to reveal a negative impression of the modified pattern 1000. For example, FIG. 11 depicts an illustrative mold base created with the modified pattern of FIG. 10 in accordance with an embodiment. The mold base 1100 comprises a cope 1105 and a drag 1110 comprising a negative impression 1115 of the modified pattern 1000. As shown, the negative impression 1115 comprises an insert recess 1120 having dimensions and volume corresponding to the extended core 1001. For example, the insert recess 1120 may have a length, width, depth, and draft corresponding to the extended core 1101.

It should be understood that the draft 1020 of the extended core 1001 and thus resulting insert recess 1120 operate to enable easy removal of the modified pattern 1000 from the cope 1105 after molding without damaging the negative impression 1115. The draft 1020 creates a slight narrowing of the extended core 1001 towards the terminal surface thereof. Accordingly, the insert recess 1120 of the negative impression 1115 has a slight widening towards the upper end thereof that allows for easy lifting of the modified pattern 1000 out of the insert recess 1120 without damaging the negative impression 1115.

Referring once again to FIG. 9, in some embodiments, assembling 920 the mold insert with the mold base may comprise inserting the mold insert within the insert recess formed in the negative impression of the mold base. For example, FIG. 11 demonstrates the mold insert 700 being placed into the insert recess 1120 of the mold base 1100 to form an assembled mold. As shown, the mold insert 700 will occupy the insert recess 1120 such that the remaining cavity of the negative impression 1115 along with the exposed features of the mold insert 700 (for example, the impressions of the letters formed as recesses on the mold insert 700) substantially forms a negative impression of the metal product to be cast including the personalized features. Accordingly, the assembled mold forms a mold cavity configured to cast the metal product according to the product design including the personalized features.

Referring once again to FIG. 9, in other embodiments, assembling 920 the mold insert with the mold base may comprise inserting the mold insert face down in the cope or drag and filling over the mold insert with foundry sand. The foundry sand may be hardened, by baking or curing, around the mold insert, wherein the hardened foundry sand mates to the mold insert. In some embodiments, the mating between the mold insert and the foundry sand may be enhanced through the inclusion of a channel around the edge of the mold insert, which may be filled with foundry sand. In some embodiments, a texture may also be included on the back of the mold insert to increase the surface area between the mold insert and the foundry sand. One of ordinary skill in the art will recognize that any alternative surface textures on the insert may enhance the mating between the mold insert and the hardened foundry sand.

It should be understood that the draft 720 of the mold insert 700 enables easy and precise mating of the mold insert 700 into the insert recess 1120 because the draft 720 substantially matches the draft of the insert recess 1120. The drafts also ensure that the mold insert 700 cannot be inserted in an inverted orientation because the draft 720 would not align with the draft of the insert recess 1120.

The assembled mold may be cleaned and/or inspected for quality control as described herein. If the assembled mold passes inspection, the metal product associated with the assembled mold can be cast 925 using conventional casting techniques well known to those of ordinarily skill in the art. After the casting process is complete, the metal product can be removed from the assembled mold and post-processing 930 of the metal product may be performed such as cleaning, polishing, inspection, and other similar post-production tasks. In some embodiments, the final metal product produced by the process 900 would appear substantially similar to the model of FIG. 5.

The process 900 as described in FIG. 9 can be used in various industries where products are cast using customized molds. However, the techniques as described herein are particular applicable to industries where highly customizable one-off products are created. For example, memorialization services that create bronze or other similarly cast products for burial markers, urns, awards, plaques, nameplates, and other similarly customized products would benefit from the mold creation and casting techniques described herein. In still further examples, the techniques described herein can be deployed in other industries including architectural, automotive, aerospace, medical (including medical devices and implants), artistic or creative, limited production run casting, or any other precision cast part application.

The development of molds according to embodiments disclosed herein provides multiple non-limiting technological advantages over conventional processes. One non-limiting technological advantage is that mold inserts produced via additive manufacturing according to some embodiments may be made to specifications and parameters that optimize cycle time and product quality for production of a portion of the mold containing customized features. Mold portions including text, decorative elements, and/or other customized features often contain intricate details that must be produced at high quality. The increased precision in molding letters and decorative features afforded by additive manufacturing may result in significant savings in terms of labor and/or production time. Furthermore, additive manufacturing may enable implementation of complex geometric features that may not be possible by traditional sand casting techniques alone.

The development of molds according to embodiments disclosed herein may use less material and/or may result in less wasted material than traditional sand casting techniques and/or additive manufacturing of complete molds. Additionally, some or all of the mold materials may be reclaimed and re-used, which will result in equally consistent mold quality and cost savings. Reclamation of mold materials can be the separation of some or all of its constituents such as foundry sand or related materials, binder materials, or activator materials, or other additives that aid in the additive manufacturing process and/or the downstream processes. Reclaimed or virgin sand may be applied in producing the traditional and 3D printed patterns. In some embodiments, reclaimed sand may be used in the production of traditional patterns, while virgin sand is used for 3D printed patterns. In some embodiments, different binder materials may be used in the traditional and 3D printed patterns such that the 3D printed pattern may be cured or baked into a traditional pattern without changing the binding properties of the 3D printed pattern. Successful reclamation efforts are identified as any level of reduction, reuse, or recyclability that provides an economic or other strategic advantage.

The embodiments disclosed herein may present significant time and cost savings over methods comprising printing of complete molds by additive manufacturing. In some embodiments, the production speed and/or the cost of producing the mold inserts may be improved due to the reduction in overall volume of material such as sand and binder that is printed by way of additive manufacturing for molding each metal product. In some embodiments, the volume of printed material may be reduced by about 30%, about 40%, about 50%, about 60%, about 70%, about 80%, about 90%, greater than about 90%, or individual values or ranges therebetween. The preceding reduction is with respect to if the complete mold were printed by additive manufacturing.

An additional technological advantage is the standardization of patterns due to the separation of customized features from the pattern. As described, the modified patterns differ from traditional patterns because modified patterns are produced without the customized features of the metal product, for example, the personalized text as shown in FIG. 5. Rather, the pattern does not imprint these features into the mold and relies on the mold insert for providing the customized features to the assembled mold and thus the metal product. Accordingly, issues with excess metal that are commonplace with traditional patterns, for example, letters and/or decorative features of the pattern shifting in the sand during filling and/or causing breakage of the sand mold upon removal therefrom, are avoided because the pattern does not include such features.

An additional consequence of the separation of the customized features from the patterns is that the patterns are "generic" and may be standardized. In some embodiments, one or more patterns may be designed, each pattern representing a standard product design. The patterns may be retained for re-use and/or reproduced by an economical and repeatable process. For example, a processing device may be used to produce one or more patterns based on standard designs. Because the customized features are included with the mold insert and are separate from the pattern, a library of re-usable patterns may be developed. In some embodiments, a library of re-usable patterns for the hybrid techniques described herein may be easily developed by modifying a library of patterns for traditional sand casting. Rather than generating brand new printed mold designs, which would require extensive development and testing, existing designs for patterns may be "retrofitted" to include and extended core representing the volume of the mold insert as described herein. Accordingly, traditional sand casting may continue to be utilized with some modification and thus conversion of an entire library of patterns to 3D printable mold designs is avoided.

The techniques disclosed herein may also take advantage of various additional advantages of additive manufacturing, including but not limited to reduced or eliminated dimensional constraints, broader applicability across substrates, and the ability to recycle and/or reuse product specifications, mold information, or the actual molds themselves.

The devices, systems, and methods as described herein are not intended to be limited in terms of the particular embodiments described, which are intended only as illustrations of various features. Many modifications and variations to the devices, systems, and methods can be made without departing from their spirit and scope, as will be apparent to those skilled in the art.

While the embodiments herein are generally discussed with respect to casting with bronze, the disclosure is not so limited. It should be understood that the methods and systems described herein can be used with various materials, including, without limitation, ferrous metals, non-ferrous metals, bronze, precious metals, aluminum, and/or combinations thereof, and/or the like.

Furthermore, while the embodiments herein after generally discussed with respect to casting memorial products, it should be understood that the methods and systems described herein can be used to create various personalized products, including plaques, markers, memorials, signs, mechanical parts, and/or the like. For example, products may be customized to a specific customer, recipient, business, organization, individual, or group of individuals.

Figure 12:
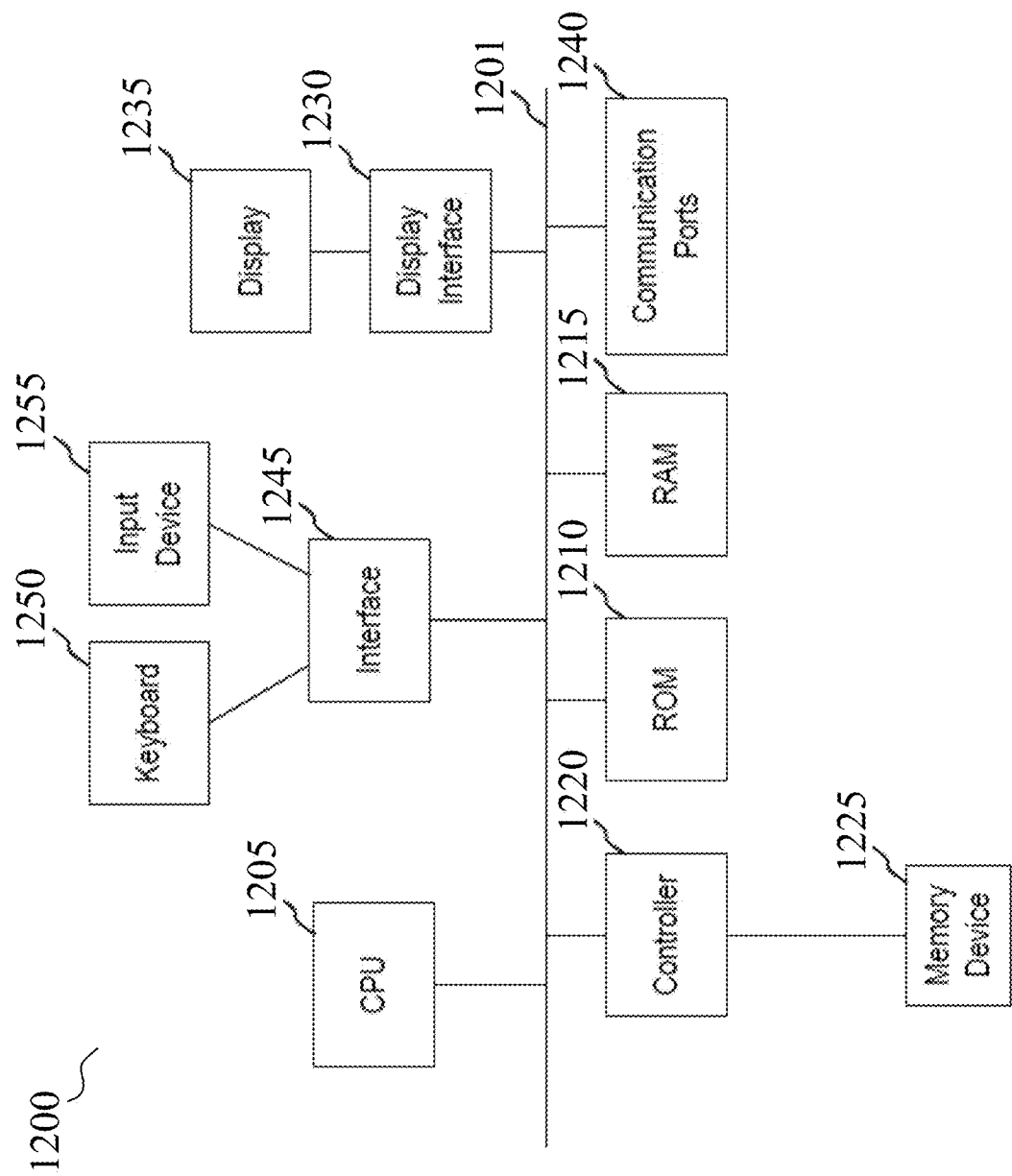
FIG. 12 depicts a block diagram of exemplary data processing system comprising internal hardware that may be used to contain or implement various computer processes and systems.

FIG. 12 depicts a block diagram of exemplary data processing system 1200 comprising internal hardware that may be used to contain or implement the various computer processes and systems as discussed above. In some embodiments, the exemplary internal hardware may include or may be formed as part of a PLC control system. In some embodiments, the exemplary internal hardware may include or may be formed as part of an additive manufacturing control system, such as a three-dimensional printing system. A bus 1201 serves as the main information highway interconnecting the other illustrated components of the hardware. CPU 1205 is the central processing unit of the system, performing calculations and logic operations required to execute a program. CPU 1205 is an exemplary processing device, computing device or processor as such terms are used within this disclosure. Read only memory (ROM) 1210 and random access memory (RAM) 1215 constitute exemplary memory devices.

A controller 1220 interfaces with one or more optional memory devices 1225 via the system bus 1201. These memory devices 1225 may include, for example, an external or internal DVD drive, a CD ROM drive, a hard drive, flash memory, a USB drive or the like. As indicated previously, these various drives and controllers are optional devices. Additionally, the memory devices 1225 may be configured to include individual files for storing any software modules or instructions, data, common files, or one or more databases for storing data.

Program instructions, software or interactive modules for performing any of the functional steps described above may be stored in the ROM 1210 and/or the RAM 1215. Optionally, the program instructions may be stored on a tangible computer-readable medium such as a compact disk, a digital disk, flash memory, a memory card, a USB drive, an optical disc storage medium, such as a Blu-Ray™ disc, and/or other recording medium.

An optional display interface 1230 can permit information from the bus 1201 to be displayed on the display 1235 in audio, visual, graphic or alphanumeric format. Communication with external devices can occur using various communication ports 1240. An exemplary communication port 1240 can be attached to a communications network, such as the Internet or a local area network.

The hardware can also include an interface 1245 which allows for receipt of data from input devices such as a keyboard 1250 or other input device 1255 such as a mouse, a joystick, a touch screen, a remote control, a pointing device, a video input device and/or an audio input device.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure as come within known or customary practice in the art to which these teachings pertain.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is also to be understood that the terminology used herein is for the purpose of describing particular embodiments only and is not intended to be limiting.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method for creating an assembled mold for casting a metal product, the method comprising:
   receiving, by a processor, product design information for the metal product, wherein the product design information includes one or more customized features for the metal product;
   generating, by the processor, a product model for the metal product based on the product design information;
   generating, by the processor, printing instructions for a mold insert based on the product model, wherein the mold insert is related to the one or more customized features;
   accessing, by a manufacturing device, the printing instructions from the processor; and
   creating, by the manufacturing device, the mold insert by an additive manufacturing process according to the printing instructions, and
   mating the mold insert with a mold base to form the assembled mold, the mold base being produced with foundry sand using a casting flask and a molding pattern, and
   wherein the assembled mold comprises a mold cavity configured to cast the metal product including the one or more customized features.

2. The method of claim 1, wherein generating printing instructions for a mold insert comprises:
   creating, by the processor, a mold insert model based on the product model; and
   creating, by the processor, the printing instructions for the mold insert based on the mold insert model.

3. The method of claim 2, wherein creating printing instructions for the mold insert comprises:
   orienting and positioning, by the processing device, the mold insert model;
   determining, by the processing device, one or more support structures for the mold insert;
   determining, by the processing device, one or more slicing patterns for the mold insert;
   performing, by the processing device, path planning for the mold insert; and
   generating, by the processing device, machine instructions for the mold insert.

4. The method of claim 3, wherein determining one or more slicing patterns comprises determining an adaptive slicing pattern for the mold insert.

5. The method of claim 1, wherein the one or more customized features of the metal product comprise one or more of customized text, images, borders, and decorations formed according to a digital file of the product design information.

6. The method of claim 1, wherein creating the mold insert by an additive manufacturing process comprises printing the mold insert with sand.

7. The method of claim 1, wherein the mold insert comprises a peripheral surface having a draft angle.

8. The method of claim 7, wherein the draft angle is between about 0° and about 30°.

9. The method of claim 7, wherein the draft angle and a depth of the mold insert are configured to mate with a recess of the mold base to form the assembled mold.

10. The method of claim 9, where the depth of the mold insert is between about 0.5 inches and about 1.5 inches.

11. The method of claim 1, wherein the mold cavity is formed by one or more surfaces of the mold base and one or more surfaces of the mold insert.

12. The method of claim 1, wherein mating the mold insert with the mold base includes placing the mold insert within the mold cavity of the mold base which has previously been formed.

13. The method of claim 1, wherein mating the mold insert with the mold base includes filling the sand of the mold base around the mold insert which has been previously formed.

14. The method of claim 13, wherein the previously formed mold insert is baked or cured before the surrounding sand of the mold base is baked or cured.

15. A system for creating an assembled mold for casting a metal product, the system comprising:
a processor;
a non-transitory, computer-readable medium storing instructions that, when executed, causes the processor to:
receive product design information for the cast metal product, wherein the product design information includes one or more customized features for the metal product,
generate a product model for the metal product based on the product design information, and
generate printing instructions for a mold insert based on the product model, wherein the mold insert is related to the one or more customized features; and
a manufacturing device operably connected to the processor and configured to:
access the printing instructions from the processing device, and
create the mold insert by an additive manufacturing process according to the printing instructions,
wherein the mold insert is configured to mate with a mold base to form an assembled mold, the mold base being produced with sand using a casting flask and a molding pattern.

16. The system of claim 15, wherein the instructions, when executed, further cause the processor to:
create a mold insert model based on the product model; and
create the printing instructions for the mold insert based on the mold insert model.

17. The system of claim 16, wherein the instructions, when executed, further cause the processor to:
orient and position the mold insert model;
determine one or more support structures for the mold insert;
determine one or more slicing patterns for the mold insert;
perform path planning for the mold insert; and
generate machine instructions for the mold insert.

18. The system of claim 17, wherein the instructions, when executed, further cause the processor to determine an adaptive slicing pattern for the mold insert.

19. The system of claim 15, wherein the one or more customized features of the metal product comprise one or more of customized text, images, borders, and decorations.

20. The system of claim 15, wherein the additive manufacturing process prints the mold insert with sand.

21. The system of claim 15, wherein the mold insert comprises a peripheral surface having a draft angle.

22. The system of claim 21, wherein the draft angle is between about 0° and about 30°.

23. The system of claim 21, wherein the draft angle and a depth of the mold insert are configured to mate with a recess of the mold base to form the assembled mold.

24. The system of claim 23, where the depth of the mold insert is between about 0.5 inches and about 1.5 inches.

25. A method of casting a metal product comprising one or more customized features, the method comprising:
obtaining, by a processor, product design information for the metal product including one or more customized features;
generating, by the processor, printing instructions for a mold insert based on the product design;
creating, by a manufacturing device, the mold insert by an additive manufacturing process according to the printing instructions;
creating a mold base based on the product design, wherein creating the mold base comprises:
filling a casting flask with foundry sand over one or more molding patterns, and
hardening the foundry sand by one or more of baking and curing to form the mold base;
mating the mold insert with the mold base to form an assembled mold; and
casting the metal product by adding molten metal to the assembled mold.

26. The method of claim 25, wherein the assembled mold comprises a mold cavity configured to cast the metal product including the one or more customized features.

27. The method of claim 25, wherein the one or more customized features of the metal product comprise one or more of customized text, images, borders, and decorations formed according to a digital file of the product design information.

28. The method of claim 25, wherein the mold insert comprises a peripheral insert surface having a draft angle.

29. The method of claim 28, wherein the draft angle is between about 0° and about 30°.

30. The method of claim 25, wherein the mold base comprises a recess sized and configured to receive the mold insert therein to form the assembled mold, wherein a peripheral recess surface comprises a draft angle configured to mate with the peripheral insert surface of the mold insert.

31. The method of claim 30, wherein a depth of the recess substantially corresponds to a depth of the mold insert.

32. The method of claim 31, where the depth of the mold insert is between about 0.5 inches and about 1.5 inches.

33. The method of claim 25, wherein a mold cavity is formed by one or more surfaces of the mold base and one or more surfaces of the mold insert.

34. The method of claim 25, wherein mating the mold insert with the mold base includes placing the mold insert within a mold cavity of the mold base which has previously been formed.

35. The method of claim 25, wherein mating the mold insert with the mold base includes filling the sand of the mold base around the mold insert which has been previously formed.

36. The method of claim 35, wherein the previously formed mold insert is baked or cured before the surrounding sand of the mold base is baked or cured.

* * * * *